United States Patent [19]
Perry

[11] Patent Number: 5,922,421
[45] Date of Patent: Jul. 13, 1999

[54] COMBINED VAPOR BARRIER AND WATER DRAIN ASSEMBLY FOR COVERS OF HEATED WATER TUBS AND POOLS

[76] Inventor: Gary L. Perry, 1221 271st St. East, Spanaway, Wash. 98387

[21] Appl. No.: 08/845,455

[22] Filed: Apr. 25, 1997

Related U.S. Application Data

[63] Continuation of application No. 08/331,179, Oct. 28, 1994, abandoned.

[51] Int. Cl.$^6$ .................................................. B32B 3/26
[52] U.S. Cl. .................... 428/34.1; 428/131; 428/138; 428/139; 4/489; 4/498; 4/499; 4/507; 442/246; 55/485; 55/486
[58] Field of Search ................................. 428/34.1, 36.1, 428/36.9, 36.91, 131, 138, 139; 4/489, 498, 499, 507; 442/246; 55/485, 486

[56] References Cited

U.S. PATENT DOCUMENTS 4,847,925  7/1989  Perry ........................................... 4/499

*Primary Examiner*—Marion McCamish
*Assistant Examiner*—Ula C. Ruddock
*Attorney, Agent, or Firm*—Roy E. Mattern, Jr.

[57] ABSTRACT

A combined vapor barrier and water assembly for securement to the underside of covers of heated water tubs and pools stands by and around an intentionally made drain opening in an otherwise water tight cover, to provide a drain passageway to be used, if necessary, whenever rain water might unwantedly enter the interior of the cover, and while standing by, to provide a vapor barrier preventing heated vapors from rising upwardly through the drain passageway. In a preferred embodiment, at least two dense weave cloth members, spaced apart, each extend completely across the cross section of the drain passageway, while positioned within a hollow contoured housing of the assembly, which is adapted to be secured to the underside of the cover round the intentionally made drain opening, to provide the drain passageway for the exiting rain water that might unwantedly collect in a cover which was originally watertight.

12 Claims, 3 Drawing Sheets

COMBINED VAPOR BARRIER AND WATER DRAIN ASSEMBLY FOR COVERS OF HEATED WATER TUBS AND POOLS

CROSS REFERENCE

This is a continuation utility patent application of the same title and same applicant based on the original utility patent application Ser. No. 08/331,179 filed on Oct. 28, 1994, now abandoned.

BACKGROUND

Many heated water tubs and pools for bathers and swimmers are located out of doors. When they are not being used, covers are placed over the water surface to keep as much heat as possible below the cover. When these covers are made firm enough to be lifted off in one piece or in several pieces, or to be tilted off to one side, they are preferably made to be watertight, so their respective overall weight will not be increased by rain water entering and staying within the cover.

However, many covers originally designed and made to be watertight, may at the outset have material imperfections, and/or manufacturing defects which are not easily detectable, and therefore they may become filled in part or completely with rain water. Or covers may at the outset of their installation, or at a later time, because of often unknown causes, such as accidental punctures or blows to the cover, etc., become altered enough so rain water or condensed water collects within the cover.

Although manufacturers and users of these covers would initially prefer that no drain holes be made or provided for in these covers, they realize that a well positioned drain is, in a practical way, a necessity. Yet when an intended and designed drain is provided in a cover, then hot vapors are known to raise and to enter the intended drain and thereafter condense within a cover and remain for a while. When this occurs, the potential exists for the water held within the cover to vaporize and enter the cells of the insulating core of the cover. Then these vapors within these cells condense, and this condensed water becomes locked in these cells of the insulating core, thereby causing the unwanted process of saturation and weight gain of the cover.

SUMMARY

A combined hot vapor barrier and a water drain assembly is secured to a respective cover of a heated water tub or pool in a location where rain water or condensed water could collect, if there was a defect in the cover. Thereafter, if during the installed lifetime of a cover, a defect should occur, permitting, for example, the entry of rain water, the rain water would drain out through this combined hot vapor barrier and water drain assembly. In a preferred embodiment, this assembly has a hollow contoured housing with a sufficient top surface for the adhesive attachment and sealing of the assembly to the bottom of the cover at the location of the intentionally provided drain opening. The hollow contoured housing also has a centered top larger cylindrical receiving volume, and a centered and aligned bottom smaller cylindrical passageway volume.

In the top larger cylindrical receiving volume, a first disc of a dense weave cloth is lowered into place on a circular shoulder. This shoulder is formed in this housing, where these larger and smaller volumes meet. This first disc fully extends across the bottom of this larger cylindrical receiving volume.

Then a spacer ring is placed over the first disc of the dense weave cloth, creating a clear centered volume above the first disc.

Thereafter, a second disc of a dense weave cloth is lowered down to rest on the spacer ring. This second disc fully extends across the top of the larger cylindrical receiving volume.

When this combined hot vapor barrier and a water drain assembly has been adhesively secured, and in doing so, well sealed to the bottom surface of a watertight bottom layer of a cover of a heated water tub or pool and centered about the intentionally provided drain, then if ever an unwanted leak should occur in the otherwise watertight cover, the rain water and/or condensed water will reach the intentionally provided drain and flow down through this assembly.

The draining rain water will first saturate the second disc of dense weave cloth. Then this water flows on to pass through the center of the spacer ring. Thereafter, the rain water saturates the first disc of dense weave cloth. Subsequently, the rain water flows down through the bottom smaller cylindrical passageway volume. Then the rain water drains down into the heated water of the tub or pool.

At the outset before a cover might become defective and leak rain water or condensed water, or later when rain water has fully drained out of a cover, this assembly is always serving as a vapor barrier. The heated vapors in attempting to enter the intentional drain of the cover, and pass on through this assembly, and into the cover, must first condense and then saturate the first disc of the dense weave cloth. If successful, and the temperature differential remains sufficiently high enough, then the created escaping vapors, pass upwardly past the spacer ring, cooling en route, thereby in part or fully becoming liquid again. If, however, some of these created escaping vapors are still successful in their escape attempt, they must enter the second disc of the dense weave cloth, to condense and to try to saturate this second disc, as they are continuing their cooling. Almost certainly they will fail in their continuing escape attempt, as the temperature differential becomes minor, and therefore no third generation of created vapors will enter the cover of a heated water tub or pool.

DRAWINGS

The combined vapor barrier and water drain assembly for covers of heated water tubs and pools, in a preferred embodiment secured to a hot water tub cover, is illustrated in most of the figures in the drawings, wherein.

Figure 6:
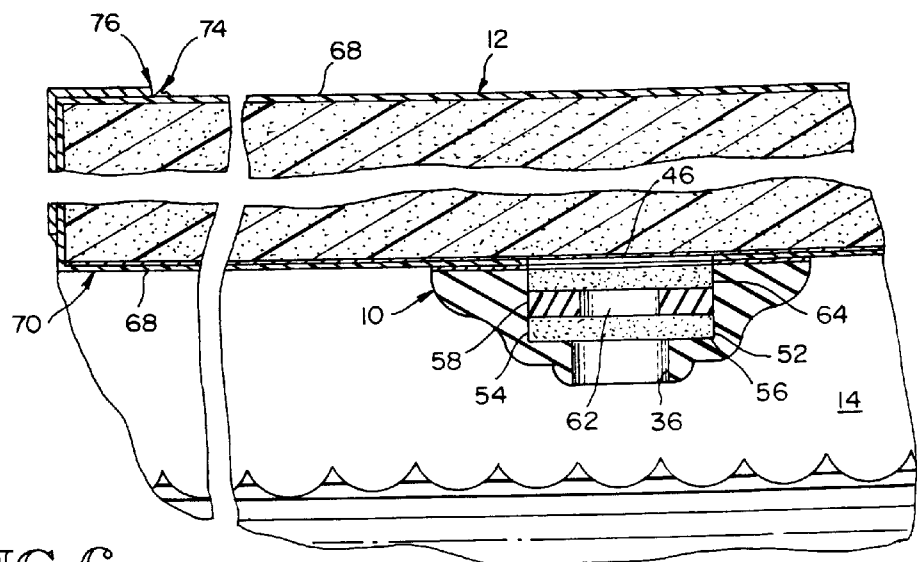
Figure 7:
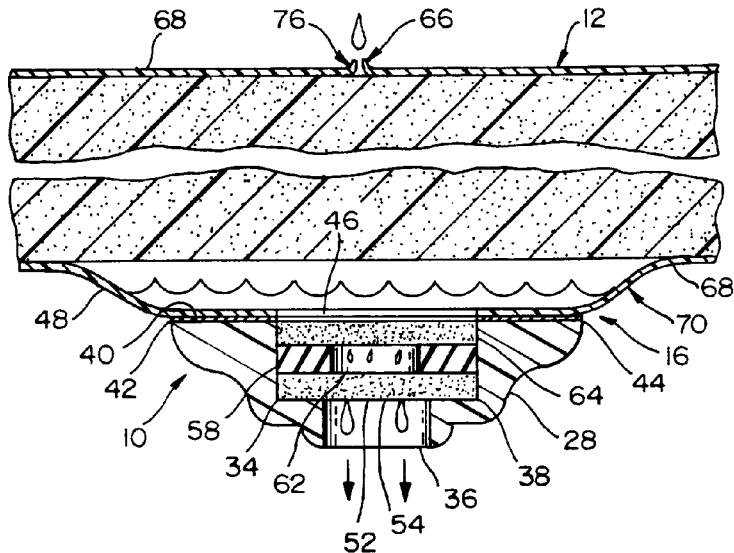
Figure 8:
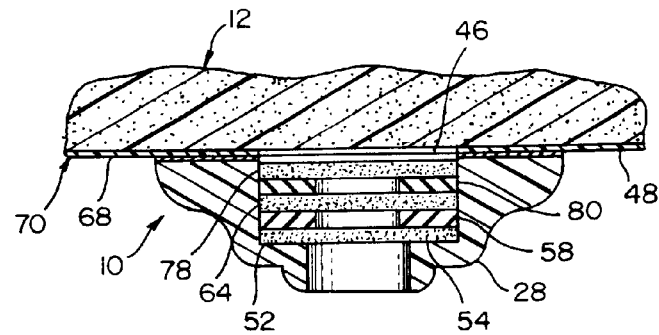
Figure 9:
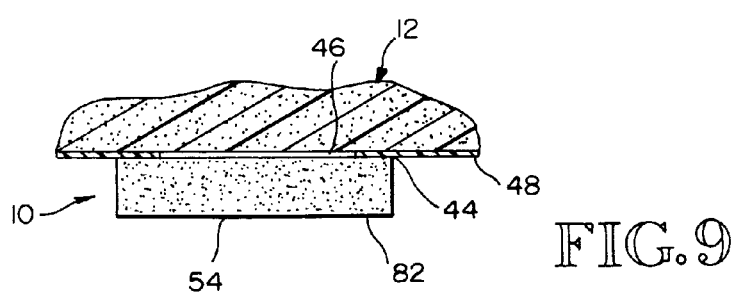

FIG. 6 is a partial cross-sectional view of both one side area and the central area of a hot tub, and also both the one side area and the central area of the hot water tub cover, where the intentional drain has been provided in the center, and the combined vapor barrier and water drain assembly is serving as a drain to drain rain water out of the cover, which has entered past a failed sealing bead location;

FIG. 7 is a partial cross sectional view of the central area of the hot water tub, i.e. the hot tub, and center portions of the hot tub cover, where the intentional drain has been provided, and the combined vapor barrier and water drain assembly is serving as a drain to drain out the rain water that is accumulating because of the unwanted opening in the top layer of the hot tub cover;

FIG. 8 is a partial cross-sectional view of the central area of the hot water tub, and the center portions of the hot water tub cover, where the intentional drain has been provided, and another embodiment of the combined vapor barrier and water drain assembly, having three dense weave cloths and two spacers positioned between them and arranged within the hollow housing, to serve as a drain to drain back out the water from the hot water tub cover, and to prevent vapors from entering the hot water tub cover; and FIG. 9 is a partial cross-sectional view of the central area of the hot water tub, and the center portions of the hot water tub cover, where the intentional drain has been provided, and another embodiment of the combined vapor barrier and water drain assembly, having only one thick dense weave cloth adhesively secured and sealed to the bottom of the hot water tub cover, to serve as a drain to drain back out the water from the hot water tub cover, and to prevent vapors from entering the hot water tub cover.

THE PREFERRED EMBODIMENT

Preferred embodiments of a combined vapor barrier and water drain assembly 10 for covers 12 of heated water tubs 14 and pools, not shown, are illustrated in the drawings.

Figure 1:
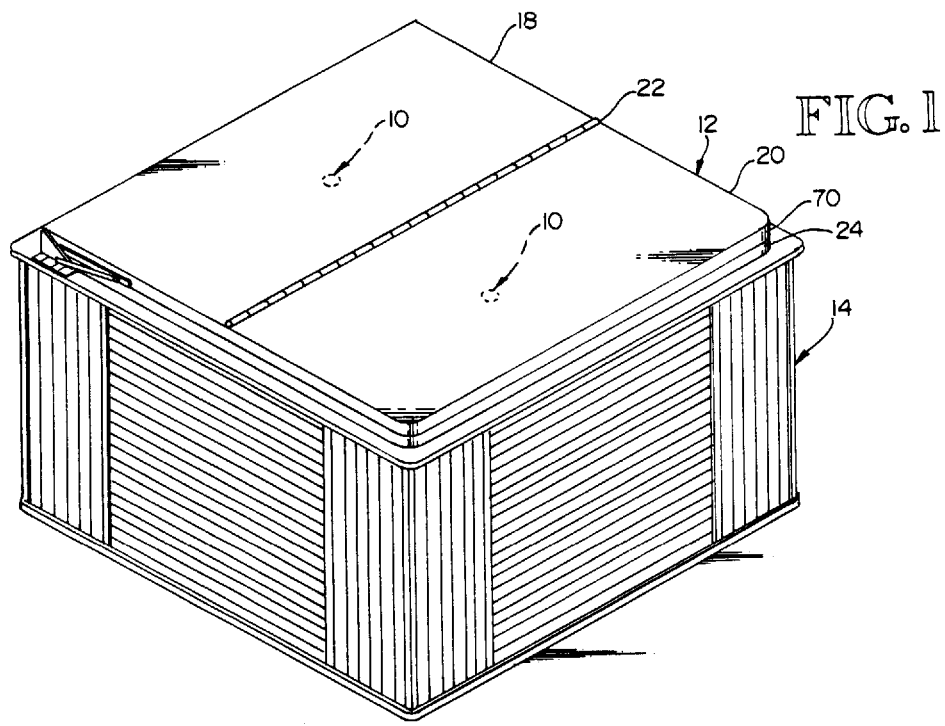
FIG. 1 is a perspective view of a hot water tub, i.e. a hot tub, showing a hinged cover of two portions, with each portion having in the central area thereof, a combined vapor barrier and water drain assembly.
Figure 2:
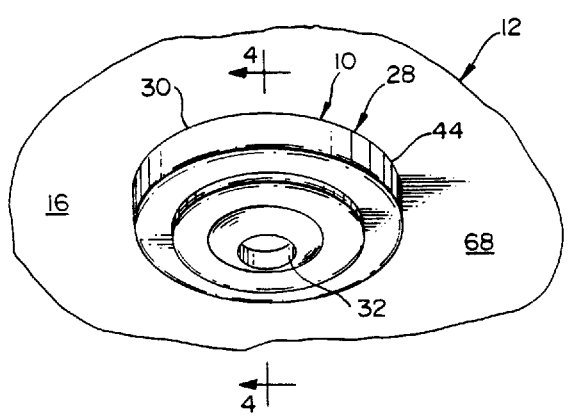
FIG. 2 is a partial perspective view of a limited central area of the bottom of a hot tub cover, and the secured combined vapor barrier and water drain assembly, which is centered about the intentionally provided drain hole or passageway in this bottom of a hot tub cover.

In FIG. 1 a cover 12 is shown having two alike combined vapor barrier and water drain assemblies 10 secured to the central bottom area 16 of each respective one half-portion 18, 20, of this centered hinged 22 cover 12 in its closed position, extending across the top 24 of a heated water tub 14, also referred to as a hot tub 14. Each assembly 10 in its depending installed position appears, as illustrated in FIG. 2. The various components of each combined vapor barrier and water drain assembly 10 are shown, when separated before they are assembled, in FIG. 3.

There is the hollow housing 28, preferably made of polyvinylchloride, known as PVC material, having an exterior 30 of reducing diameters, and an interior 32 having both a centered top larger cylindrical receiving volume 34 and a centered and aligned bottom smaller cylindrical passageway volume 36. At this transition between these volumes 34 and 36, a shoulder 38 is formed. The top 40 of this housing has a ring surface 42 which receives a waterproof adhesive 44, in sufficient quantity over a sufficient area, whereby each assembly 10 is firmly secured and sealed to a respective central bottom area 16 of a cover 12. Each combined vapor barrier and water drain assembly 10 is located, where an intentional drain 46 is made in a lower layer 48 of a cover 12, which is a watertight plastic material. Such a drain 46 is shown in FIG. 4.

Figure 3:
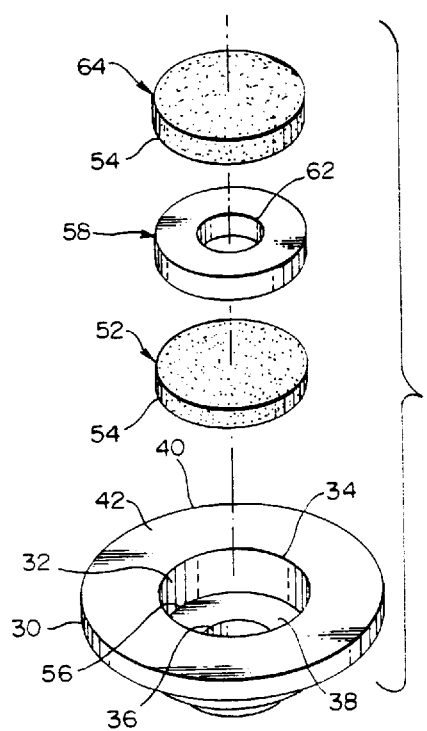
FIG. 3 is an exploded view of the combined vapor barrier and water drain assembly having the hollow housing, a first and second dense weave cloth, and a spacer between them.
Figure 4:
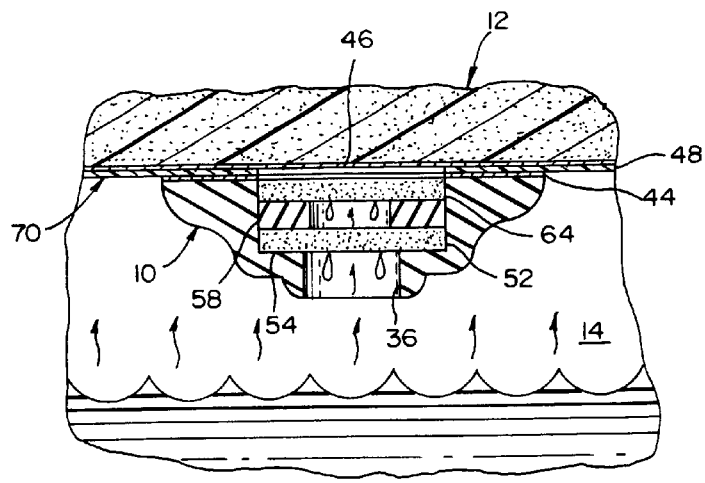
FIG. 4 is a partial cross-sectional view of the central area of a hot water tub, i.e. hot tub, and the center portions of the hot tub cover, where the intentional drain has been provided, and this combined vapor barrier and water drain assembly is serving the vapor barrier function, when no rain water has collected in the cover.

The placements of the various components of a combined vapor barrier and water drain assembly 10, are illustrated in FIGS. 3 and 4. A first disc 52 of a dense weave cloth 54 is lowered into place to rest on a shoulder 38, and be positioned fully across the bottom 56 of the centered top larger cylindrical receiving volume 34 of the hollow housing 28. Preferably, this first disc 52 is made of a polypropylene material. Then a spacer ring 58, preferably made of neoprene material, is laid down over the first disc 52, creating a central small volume 62. Thereafter, a second disc 64 of a like dense weave cloth 54, made, for example, from polypropylene material, is laid down over the spacer ring 58 to complete the filling of the centered top larger cylindrical receiving volume 34 of the hollow housing 28. This assembly of the hollow housing 28, the first disc 52, the spacer ring 58, and the second disc 64, completes the manufacture of this embodiment of the combined vapor barrier and water drain assembly 10.

In respect to most covers 12 for hot water tubs 14, or hot water pools, not shown, which are made strong enough to keep small children from falling into the so called hot tubs or hot pools, the necessary strength is obtained without making the covers 12, too heavy. Yet the stronger and lighter porous and/or foamed celled materials used, must initially be covered with watertight materials such as plastic materials, so the cover remains free of rain water and/or condensed water at all times. If rain water does enter the interior of the cover, or vapors enter the cells to condense and become locked therein, the overall weight of the cover increases, often becoming excessive.

Throughout all the embodiments the dense weave cloth 54 is selected from materials, such as the polypropylene material, which have close cell structure that water vapor can condense in. Then the resultant water droplets are held suspended in the selected material. When this material becomes fully saturated the permeability rate of the material becomes zero. Any additional accumulation of water droplets drain from the selected material.

Preferably, a cover 12 of a hot water tub 14 should at the outset be made watertight, and remain so throughout the time it is used. As a practical matter, however, either during manufacture and/or at a later use time, leaks of respective sizes and locations may occur. Therefore, this combined vapor barrier and water drain assembly 10 is installed at the outset, or at a later time, at each central bottom area to insure the drainage of any collected rain water, or collected cleaning water, which might have entered the cover 12.

At a time when there are no leaks in a cover 12, or when all leaks which may have occurred earlier have drained away, the status of the combined vapor barrier and water drain assembly 10 is illustrated in FIG. 4. Vapors, in trying to rise upwardly from within the hot water tub 14 and trying to enter an intentionally made drain hole 46 in a cover 12, must first try to condense and then saturate the first disc 52 of the dense weave cloth 54. If the temperature differential between the temperature of the hot air below the cover of this assembly 10 and the temperature of the air above the top surface of this first disc 52 of the dense weave cloth 54 is great enough, then new escaping vapors are formed. These vapors, escape upwardly from the first disc 52, and enter the central small volume 62 at the level of the spacer ring 58, and often cool down sufficiently to condense. Yet if vapors still are present, they enter the second disc 64 and condense and try to fully saturate this second disc 64. Saturation will occur, and if there is an insufficient temperature differential, between the air temperatures on the respective sides of the second disc 64, the assembly 10 adequately serves as a vapor barrier. Therefore, preferably, during the manufacture of a hot water tub cover 12, the combined vapor barrier and water drain assembly 10 is installed, knowing if there is no damage, no rain water will enter a cover, and also no vapor will enter a cover to subsequently condense and collect. But later, if the cover 12 during its use is damaged in some way, then the drain function of this assembly will successfully insure the rain water and condensed water will drain out.

Figure 5:
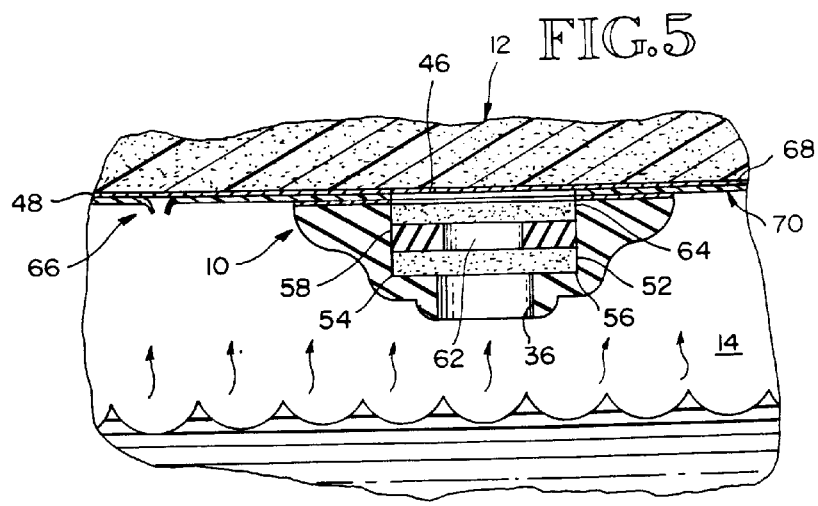
FIG. 5 is a partial cross-sectional view of the central area of the hot water tub, and the center portions of the hot water tub cover, where the intentional drain has been provided, and the combined vapor barrier and water drain assembly is serving as a drain to drain back out the water that is accumulating because of the unwanted opening in the bottom layer of the hot water tub cover.

In respect to possible damage, in FIG. 5, a cut or puncture 66 of vinyl material 68 extending across the bottom 70 of a cover 12 is illustrated. Any rain water getting into the cover 12 when it has been removed with the bottom, in effect, becoming the top, will, after the replacement of the cover 12 over the hot water tub 14, drain out through both the cut or puncture 66 and also the combined vapor barrier and water drain assembly 10. Vapors rising through puncture 66 condense upon contact with interior surfaces, and this water leaves through drain assembly 10.

Regarding other possible unwanted sources of leaks, when sealing materials are arranged in continuous beads 74, as shown in FIG. 6, there are times when the sealing materials are sufficiently damaged, so rain water will enter the interior of a cover for a heated water tub. If this occurs, then the collecting rain water reaches the combined vapor barrier and water drain assembly 10, and passes down into the hot water of the tub 14. The cover 12 illustrated in part in FIG. 6, is also illustrated and described in U.S. Pat. No. 4,857,374.

There will be times when there is direct damage to the top of a cover 12, as illustrated in FIG. 7. Most of the time, this top type of damage 76 is readily observed, and repair kits furnished with covers 12, are used to repair the damage. Yet, if the damage is not seen, or seen but not repaired quickly, then any rain water which collects in the cover 12, will depart from the cover 12, through the combined vapor barrier and water drain assembly 10.

This assembly 10 therefore is ready at all times, to drain out water, which unwantedly is collecting in the interior of a cover 12, because one or more of these various defective places is providing an entry into the interior of the cover 12. Yet, when the draining function is completed for a while, the intentionally made drain opening 46 remains inaccessible to rising vapors leaving the surface of the heated water, because these vapors encounter the barrier created by the assembly 10 and they are not able to enter the cover 12 and condense to create an unwanted quantity of water within the cover 12 of a heated water tub 14, or pool, not shown.

Although the most preferred embodiment has been illustrated in FIGS. 1 through 7 for use when the hot water temperatures range between one hundred degrees Fahrenheit to one hundred and four degrees Fahrenheit, there may be times when the water temperatures become higher, and/or the temperature differential between the hot air below the cover and the cooler air above the bottom layer of the cover becomes higher, and if so then an embodiment as illustrated in FIG. 8 would be secured and sealed to the bottom layer of a cover. In this embodiment, there are three discs of the dense weave cloth; the first disc 52, the second disc 64, and the third disc 78. A second spacer ring 80 is used with the original or first spacer ring 58 to space the respective discs apart from one another. The hollow housing 28 is made larger to accommodate the added disc and spacer. Or the discs and the spacers are made thinner to fit the hollow housing.

The objective remains to insure that the temperature differential between the air located below a top disc and the air above it at the bottom layer of the cover is low enough, or zero, so no water vapors will be created over the top disc of the dense weave cloth. This in turn insures that vapors will not enter into the cover, placed over the heated water, to thereafter enter cells of insulating material where the vapors condense and become locked. If such locked condensed water continues to accumulate, the cover becomes saturated, and the weight gain of the cover becomes unacceptable.

Under some circumstances, an embodiment, such as illustrated in FIG. 9, might be considered. A thicker single disc 82 of dense weave cloth 54 is secured and sealed about the intentional drain 46 in the lower, otherwise waterproof, layer 48, of the cover 12. The escaping vapors in condensing and saturating this disc 82 result in a cooling, whereby the air temperature at the top of the bottom layer 48 of the cover 12, is at a temperature which insures that no escaping vapors will be created at the top of this disc 82, which, otherwise, could enter the cover 12, through the intentional drain 46.

Preferably, all embodiments of the combined vapor barrier and water drain assembly 10, are placed about intentionally made drains 46, which in turn are made at the central area 16 of a lower layer 48 of a cover 12. These waterproof lower layers 48 are preferably only secured about their edges, and therefore, by gravity, a sag occurs, which creates an air space in this central area 16. This sag becomes very noticeable, as indicated in FIG. 7 when, for example, rain water, after entering the cover 12, is collecting by the intentionally made drain 46. In the other figures, such increased sagging is not illustrated, but it would occur, if quantities of rain water or condensed water started to accumulate.

Wherever and whenever this combined vapor barrier and water drain assembly 10 is used, accumulating water will flow out of a volume where it is not wanted, and when the draining flow stops, any vapors trying to enter the drain will be condensed and drained out before entering the volume which was previously drained.

I claim:

1. A combined vapor barrier and water drain assembly, for subsequent securement to covers of hot tubs and hot pools, and these hot tubs and hot pools contain heated water, and these covers of hot tubs and hot pools have a topside, surrounding sides and an underside, comprising:

a. a hollow housing having a top and a bottom, and having a centered receiving volume extending from the top and a bottom of this hollow housing, and this top of the hollow housing is subsequently secured to an underside of a cover of a hot tub or a hot pool;

b. a first dense weave cloth supported by the hollow housing and extending fully across centered receiving volume of the hollow housing;

c. a spacer having a central open area placed over the first dense weave cloth; and d. a second dense weave cloth placed over the spacer and extending fully across the centered receiving volume of the hollow housing, and when this combined vapor barrier and water drain assembly is subsequently secured to a hot tub or a hot pool, this second dense weave cloth, receives and condenses any water vapors passing up from the first dense weave cloth and through the central open area of the spacer, and becomes saturated with water, the water surface tension created aids in blocking the formation of any water vapors, when the difference in the temperature below and above the second dense weave cloth is low enough, so no water vapors are formed to escape to unwantedly enter a cover of a hot tub or a hot pool, and yet, when unwanted water ever enters a cover of a hot tub or hot pool, the water will drain down through the second dense weave cloth, then on through the central open area of the spacer, then down through the first dense weave cloth, and then drop down into the hot water of a hot tub or hot pool.

2. A combined vapor barrier and water drain assembly, for subsequent securement to covers of hot tubs and hot pools, as claimed in claim 1, wherein the top of the hollow housing has a surface area around the centered receiving volume, and this surface area subsequently receives an adhesive to secure and to seal the hollow housing to a bottom of a cover of a hot tub or hot pool.

3. A combined vapor barrier and water drain assembly, for subsequent securement to covers of hot tubs and hot pools, as claimed in claim 1, wherein the hollow housing, instead of having one centered receiving volume has two centered receiving volumes, therefore, one is called the above centered receiving volume, and the other is called the below centered receiving volume, and this below centered receiving volume has less cross-sectional area than the above centered receiving volume, and the hollow housing then has a shoulder located between these respective centered receiving volumes, and the first dense weave cloth is supported on this shoulder, and then the spacer is supported on the first dense weave cloth, and then the second dense weave cloth is supported, on the spacer.

4. A combined vapor barrier and water drain assembly, for subsequent securement to covers of hot tubs and hot pools, as claimed in claim 1, wherein the centered receiving volume is cylindrical; the spacer is a ring spacer; and the first and second dense weave cloths are dense weave cloth discs.

5. A combined vapor barrier and water drain assembly, for subsequent securement to covers of hot tubs and hot pools, as claimed in claim 4, wherein the hollow housing, instead of having only one centered receiving volume has two centered receiving volumes, one is called, the above centered receiving volume, and the other is called the below centered receiving volume, which is cylindrical and of less cross-sectional area than the above centered receiving volume, the hollow housing then has a shoulder located between these respective centered receiving volumes, and on this shoulder the first dense weave cloth disc is supported, and then the spacer is supported on the first dense weave cloth disc, and then the second dense weave cloth disc is supported on the spacer.

6. A combined vapor barrier and water drain assembly, for subsequent securement to covers of hot tubs and hot pools, as claimed in claim 5, wherein the top of the hollow housing has a surface area around the top of the centered receiving volume, which subsequently receives an adhesive to secure and to seal the housing to a bottom of a cover of a hot tub or hot pool, at a location where an intentional drain has been made in a cover.

7. A combined vapor barrier and water drain assembly for subsequent securement to covers of hot tubs and hot pools, as claimed in claim 4, wherein the top of the hollow housing has a surface area around the top of the centered receiving volume which subsequently receives an adhesive to secure the housing to a bottom of a cover of a hot tub or hot pool, at a location where an intentional drain has been made in a cover.

8. A combined vapor barrier and water drain assembly for subsequent securement to covers of hot tubs and hot pools, comprising:

a. a hollow housing having a top, a bottom an outer surface, an inside shoulder, and also two centered and aligned cylindrical receiving volumes, and one of them is a top centered larger diameter cylindrical receiving volume, having a top and a bottom, and the other of them is a bottom smaller diameter cylindrical volume, having a top and a bottom, and the outer surface reduces in diameter, varying from the largest diameter at the top of the hollow housing to the smallest diameter at the bottom, of the hollow housing and the top of this hollow housing has a top surface area, which subsequently receives an adhesive, when this hollow housing is subsequently secured and sealed to a cover about a drain hole in a cover, which is intentionally made in a cover, where unwanted water could collect within a cover if a drain hole were not made, and through this drain hole, any possibly collecting water or condensed water will drain out, down, and into a hot tub or hot pool, and the inside shoulder is common both to the bottom of the centered larger diameter cylindrical receiving volume and to the top of the smaller diameter cylindrical volume;

b. a first dense weave initially unsaturated cloth, formed as a disc, and fully extending across the bottom of the centered larger cylindrical receiving volume and resting on the inside shoulder of the hollow housing;

c. a ring spacer having an open center placed over the first dense weave cloth formed as a disc, leaving a centered space, which is this open center of the ring spacer, in the hollow housing and this centered space is located above the first dense weave cloth formed as a disc; and d. a second dense weave initially unsaturated cloth formed as a disc, and fully extending across the centered larger diameter cylindrical receiving volume, and positioned directly on the ring spacer and positioned at the top of the larger diameter cylindrical receiving volume; and after this combined vapor barrier and water drain assembly is subsequently secured to a hot tub or a hot pool, when vapors reach the first dense weave cloth, and condense, and when this first dense weave cloth becomes saturated, thereafter, any possible created vapors, leaving this first dense weave cloth, must travel through the centered space located by the ring spacer, before entering the second dense weave cloth to condense therein and to attempt to saturate this second dense weave cloth, and because cooling is occurring, reducing surrounding temperatures, more vapors are not created, and the condensed water which is formed drains into the hot tub or hot pool, and vapors do not enter a cover through an intentionally made drain hole in a cover, yet this drain hole always remains ready, if necessary, to drain out water from a cover, if an unwanted water leak should occur in a cover.

9. A combined vapor barrier and water drain assembly for subsequent securement to covers of hot tubs and hot pools, as claimed in claim 8, wherein the first and second dense weave cloths are made of polypropylene material.

10. A combined vapor barrier and water drain assembly for subsequent securement to covers of hot tubs and hot pools, as claimed in claim 9, wherein the hollow housing is made of polyvinyl chloride material.

11. A combined vapor barrier and water drain assembly for subsequent securement to covers of hot tubs and hot pools, as claimed in claim 10, wherein the ring spacer is made of neoprene material.

12. The combination of a cover for a hot tub or a hot pool, and a combined vapor barrier and water drain assembly, comprising:

a. a cover for a hot tub or a hot pool having a top and bottom and surrounding sides extending between the top and bottom, and a drain hole in the bottom of the cover, and b. a combined vapor barrier and water drain assembly, comprising:

i. a hollow housing having a top, a bottom, an outer surface, an inside shoulder, and also two centered and aligned cylindrical receiving volumes, and one of them is a top centered larger diameter cylindrical receiving volume having a top and a bottom, and the other one of them is a bottom smaller diameter cylindrical volume having a top and a bottom, and the outer surface reduces in diameter, varying from the largest diameter at the top of the hollow housing to the smallest diameter at the bottom of the hollow housing and the top of this hollow housing has a top surface area which receives an adhesive, to secure and to seal this hollow housing to the bottom of the cover at the drain hole location, and the inside shoulder is common both to the bottom of the centered larger diameter cylindrical receiving volume, and to the top of the smaller diameter cylindrical volume;

ii. a first dense weave initially unsaturated cloth, formed as a disc, and fully extending across the bottom of the centered large cylindrical receiving volume and resting on the inside shoulder of the hollow housing;

iii. a ring spacer having an open center placed over the first dense weave cloth formed as a disc, leaving a centered space, which is this open center of the ring spacer, in the hollow housing and this centered space is above the first dense weave cloth formed as a disc; and iv. a second dense weave initially unsaturated cloth formed as a disc and fully extending across the centered larger diameter cylindrical receiving volume at the top of the larger diameter cylindrical receiving volume; and after this combination of the cover and the combined vapor barrier and water drain assembly is subsequently placed across the top of a hot tub or a hot pool, when vapors reach the first dense weave cloth, and condense, and when this first dense weave cloth becomes saturated, hereafter, any possible created vapors, leaving this first dense weave cloth, must travel through the centered space located by the ring spacer, before entering the second dense weave cloth to condense therein and to attempt to saturate this second dense weave cloth, and because cooling is occurring which reduces the surrounding temperatures, more vapors are not created, and the condensed water which is formed drains into the hot tub or hot pool, and vapors do not enter the drain hole of the cover, yet the drain hole in the cover remains always ready to drain out water from the cover, if an unwanted water leak should occur in the cover.

\* \* \* \* \*